Patented July 3, 1928.

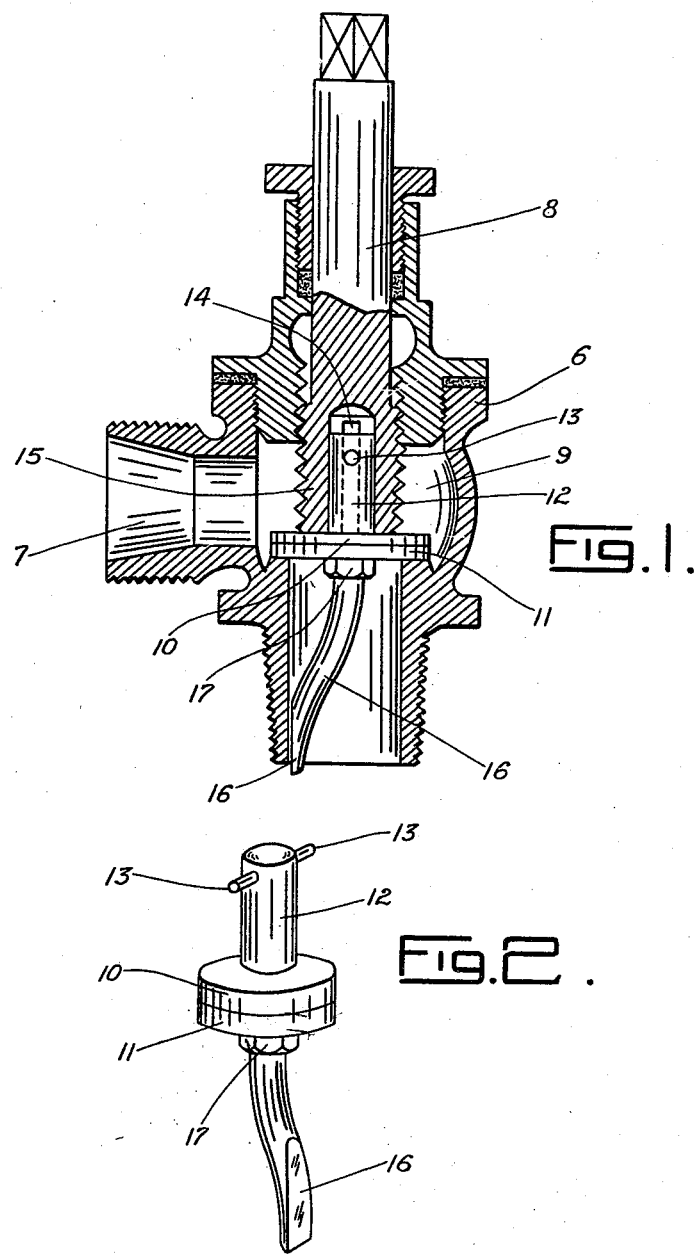

1,675,968

UNITED STATES PATENT OFFICE.

CHARLES ALBERT BRITNELL, OF MARRICKVILLE, NEAR SYDNEY, NEW SOUTH WALES, AUSTRALIA.

MEANS FOR CLEANING THE COCK CONNECTIONS BETWEEN MAINS AND SERVICE OR BRANCH PIPES.

Application filed December 3, 1926, Serial No. 152,496, and in Australia December 15, 1925.

This invention relates to improved means for cleaning or removing rust and other foreign matter from the lower portion of the cock which is screwed into the main and connects with the service pipe.

In such cocks at present the rust or foreign matter tends to accumulate in the lower portion thereof preventing the free flow of water to the service pipe. To remove it necessitates unscrewing of the several parts and insertion of a wire scraper, or otherwise closing down the main valve and removal of the cock from the main which frequently requires excavation work.

According to the invention the valve spindle is extended to pass into the lower portion of the cock screwed into the main. This extension or arm is turned or bent to an angle and ends in a scraper point. The valve stem is integral with the spindle being of reduced diameter, or it may be secured thereto, but the washer or washers is or are loose on the stem being prevented from dropping too far by means of a suitable lock nut.
But in order that my invention may be more clearly understood. I will now refer to the accompanying drawings in which Figure 1, is a sectional elevation of a cock constructed in accordance with the invention, the scraper being shown in the lowered position, while Figure 2, is a perspective view of the spindle and valve with the scraper shown attached thereto.

The same reference numerals indicate like parts throughout the drawings.

6 is a cock or valve of standard construction with branch connection 7. The valve stem 8 extends down into the lower or valve chamber 9 and has connected to it a valve 10 with leather valve washer 11 by means of the spindle 12 provided with pins 13 adapted to enter and slide in slots 14 in the lower threaded portion 15 of the valve stem. To this valve 10 is secured by means of a nut or threaded member 17, the scraper 16 which is so formed that on turning the valve stem 8 the scraper 16 is revolved and so removes rust or foreign matter that may have accumulated in the lower portion of the cock 6.

In some cases I may make the scraper 16 integral with the valve 10 instead of having it detachable as illustrated.

I claim.

A valve for use as a connection between a main and a service pipe and comprising a body having a nipple for attachment to a main and provided with a seat at the inner end of its bore, a nipple for attachment to a service pipe, arranged at an angle to the first-named nipple said body having a chamber in the angle between and forming a connection between said nipples; a stem arranged axially with respect to the main nipple and threadedly connected to the body, a valve disc having a stud arranged in a bore in the lower portion of said stem, said stem having a longitudinal slot and said stud having a pin slidably engaged in said slot, said valve disc being arranged to close on the said seat and to turn on said seat but remain closed thereon when said stem is unscrewed, and being further provided with a scraper arm arranged for action in the bore of the main nipple.

In testimony whereof I have hereunto set my hand.

CHARLES ALBERT BRITNELL.